(12) United States Patent
Hachikian et al.

(10) Patent No.: US 9,085,710 B2
(45) Date of Patent: Jul. 21, 2015

(54) TOUGHENED EPOXY SYSTEM FOR ABRASION RESISTANT COATINGS

(75) Inventors: Zakar R. Hachikian, Chelmsford, MA (US); Bhavesh Nayak, Waltham, MA (US); Zeenat F. Imam, Peabody, MA (US)

(73) Assignee: Illinois Tool Works Inc., Glenview, IL (US)

( * ) Notice: Subject to any disclaimer, the term of this patent is extended or adjusted under 35 U.S.C. 154(b) by 225 days.

(21) Appl. No.: 13/524,428

(22) Filed: Jun. 15, 2012

(65) Prior Publication Data

US 2013/0052355 A1 Feb. 28, 2013

Related U.S. Application Data

(60) Provisional application No. 61/528,880, filed on Aug. 30, 2011.

(51) Int. Cl.

| | |
|---|---|
| *C09K 3/10* | (2006.01) |
| *C08L 63/00* | (2006.01) |
| *C09D 163/00* | (2006.01) |
| *C08K 3/00* | (2006.01) |
| *C08K 3/20* | (2006.01) |
| *C08L 9/02* | (2006.01) |
| *C08L 35/04* | (2006.01) |

(52) U.S. Cl.
CPC ............ *C09D 163/00* (2013.01); *C08K 3/0033* (2013.01); *C08K 3/20* (2013.01); *C08L 9/02* (2013.01); *C08L 35/04* (2013.01); *C08L 2666/54* (2013.01)

(58) Field of Classification Search
CPC .................................................... C09D 163/00
USPC .................................. 427/386; 523/400, 438
See application file for complete search history.

(56) References Cited

U.S. PATENT DOCUMENTS

| | | | | |
|---|---|---|---|---|
| 4,931,125 | A * | 6/1990 | Volkmann et al. | 156/272.8 |
| 5,229,438 | A * | 7/1993 | Ishida et al. | 523/428 |
| 6,124,067 | A * | 9/2000 | Mikuriya et al. | 430/100 |
| 6,462,107 | B1 * | 10/2002 | Sinclair et al. | 523/456 |
| 6,486,256 | B1 * | 11/2002 | Tarbutton et al. | 525/65 |
| 7,547,373 | B2 * | 6/2009 | Hachikian | 156/330 |
| 2002/0115736 | A1 * | 8/2002 | Koshy | 521/99 |
| 2005/0100709 | A1 * | 5/2005 | Bescup et al. | 428/143 |
| 2005/0276926 | A1 | 12/2005 | Ginsberg | |
| 2010/0209690 | A1 | 8/2010 | Sang et al. | |
| 2010/0266809 | A1 * | 10/2010 | Schulenburg et al. | 428/124 |
| 2013/0037213 | A1 * | 2/2013 | Frick et al. | 156/330 |
| 2013/0230726 | A1 * | 9/2013 | Frick et al. | 428/414 |

FOREIGN PATENT DOCUMENTS

| | | |
|---|---|---|
| CN | 102220068 | 10/2011 |
| WO | WO 2012/091897 A1 | 7/2012 |

OTHER PUBLICATIONS

Henkel Technologies, LOCTITE® Nordbak® Wearing Compound™ Technical Data Sheet, Jan. 2007.
Henkel Technologies, LOCTITE® Nordbak® Pneu-Wear™ Technical Data Sheet, Feb. 2009.
ITW Devcon, Devcon® Combo Wear FC Technical Data Sheet, Jan. 26, 2012.
ITW Devcon, Devcon® Wear Guard™ Ultra Technical Data Sheet, Apr. 9, 2012.
ITW Devcon, Devcon® Wear Guard™ Fine Load Technical Data Sheet, Apr. 14, 2010.
ITW Devcon, Devcon® Wear Guard™ High Load Technical Data Sheet, Apr. 14, 2010.
Belzona® International Limited, Belzona® 1811 (Ceramic Carbide) Publication No. 21-3-04, © 2004, Printed in England.
Belzona® International Limited, Belzona® 1311 (Ceramic R-Metal) Publication No. 10-2-07, © 2007, Printed in England.
A.W. Chesterton Company, ARC® Composite Technology ARC 897 Product Data Sheet, © 2008.
A.W. Chesterton Company, ARC® Composite Technology ARC MX1 Product Data Sheet, © 2008.
A.W. Chesterton Company, ARC® Composite Technology ARC 890 Product Data Sheet, © 2008.
Bao, H. et al. "Two-Component Epoxy Resin-Based Wear-Resisting Adhesive Coating With High Mechanical Strength and Its Manufacture", Chemical Abstracts Service, Columbus, Ohio, Oct. 21, 2011.

\* cited by examiner

*Primary Examiner* — Megan McCulley
(74) *Attorney, Agent, or Firm* — Pauley Peterson & Erickson (57) ABSTRACT

An epoxy-based coating system for metal industrial equipment and parts provides superior abrasion resistance compared to known coating compositions. The coating system includes a resin component and a hardener component. The resin component includes one or more bisphenol epoxy resins and inorganic beads. The hardener component includes a butadiene acrylonitrile rubber, one or more curing agents, and inorganic beads. The resin component and hardener component are mixed together, applied to a metal surface, and cured to form the abrasion-resistant coating.

15 Claims, 4 Drawing Sheets

TOUGHENED EPOXY SYSTEM FOR ABRASION RESISTANT COATINGS

RELATED APPLICATIONS

This patent application claims priority to U.S. Provisional Application No. 61/528,880, filed on 30 Aug. 2011, the disclosure of which is incorporated by reference.

FIELD OF THE INVENTION

This invention is directed to a toughened epoxy system for coating and protecting heavy industrial equipment from surface damage.

BACKGROUND OF THE INVENTION

Various industries utilize processing equipment that is exposed to extreme use conditions. Examples of such industries include the mining of coal, mineral and ore; the formation of products from aggregates (e.g. quarry, sand and rock); the wood and pulp industries; and the cement production industry. In these industries, it is important to protect expensive processing equipment against highly abrasive materials, for example processed solids and slurries. Without a protective coating, particularly on the primary contact areas of such equipment, the equipment life would be considerably shortened, and repair and replacement costs would soar.

Abrasion resistant coatings provide a sacrificial protective layer between the abrasive environment and the metal surface of the processing equipment. As long as the coating remains intact, the equipment is protected from abrasive media and expensive repair or replacement can be avoided. Common applications for such abrasion resistant coatings include without limitation scrubbers, ash handling systems, pipe elbows, cyclones, chutes, re-contour chippers, bins, hoppers, bunkers, separators, digester tables, exhausters, launderers, fan housings, fan blades, pump boxes, float cells, screw conveyors and augers.

While various prior art protective coatings are known, they wear relatively easily and require frequent replenishment in order to prevent damage to the industrial equipment. If the wear occurs too quickly during equipment use, it might not be noticed in time to perform preventative maintenance and replenish the coating. There is a need or desire for a protective coating material that provides improved, long-term abrasion resistance under a variety of use conditions.

SUMMARY OF THE INVENTION

The present invention is directed to an epoxy-based coating system which provides excellent abrasion resistance to metal surfaces. The abrasion resistance is quantified using impact abrasion and sliding abrasion tests. Related adhesion properties are quantified using lap shear adhesion, T-Peel adhesion, side impact resistance, and drop impact resistance tests. All of the abrasion and adhesion test procedures are described below. The epoxy-based coating system includes about 50-85 parts by volume of a resin component and about 15-50 parts by volume of a hardener component.

The resin component includes about 10-90% combined weight of one or more bisphenol epoxy resins and about 10-90% by weight inorganic beads. The hardener component includes about 2-50% by weight of a butadiene acrylonitrile rubber, about 2-50% combined weight of one or more curing agents, and about 10-90% by weight inorganic beads.

The present invention is also directed to a method of forming an abrasion-resistant protective coating on a metal surface. The method includes the steps of mixing a resin component and a hardener component together in an amount of about 40-85 parts by volume of the resin component and about 15-60 parts by volume of the hardener component, to form a mixture; applying the mixture to a metal surface to form a coating; and curing the coating on the metal surface to form the abrasion-resistant protective coating. The resin component and the hardener component include the compositions described above, and further characterized in the detailed description below.

With the foregoing in mind, it is a feature and advantage of the invention to provide an epoxy-based coating system for metal surfaces, especially for metal surfaces of industrial equipment, which exhibits excellent physical properties as described below.

DETAILED DESCRIPTION OF THE INVENTION

In one aspect, the present invention is directed to an epoxy-based coating system for providing abrasion resistance to metal surfaces. The epoxy-based coating system includes about 40-85 parts by volume of a resin component, suitably about 45-80 parts by volume, or about 60-75 parts by volume, or about 65-70 parts by volume. The epoxy-based coating system includes about 15-60 parts by volume of a hardener component, suitably about 20-55 parts by volume, or about 25-40 parts by volume, or about 30-35 parts by volume. The resin component and the hardener component can be stored in separate containers or compartments, and can be mixed together immediately prior to application to a metal surface, using techniques familiar to persons of ordinary skill in the art.

The resin component includes about 10-90% combined weight of one or more bisphenol epoxy resins, suitably about 15-65% by weight, or about 20-40% by weight. Bisphenol-A epoxy resin, or a combination of bisphenol-A and bisphenol-F, are examples of suitable bisphenol epoxy resins. One suitable bisphenol-A is sold by Kaneka Texas Corp under the trade name KANE ACE MX-125, as a mixture of bisphenol-A epoxy resin and a butadiene acrylic copolymer. Another suitable bisphenol-A epoxy resin is DER 331 sold by Dow Chemical Co. Suitable bisphenol-F epoxy resins include EPON DPL-862 sold by Momentive Co. (formerly known as Hexion) and DER 354 sold by Dow Chemical Co. The bisphenol epoxy resins contribute to abrasion resistance of the coating composition.

The resin component includes about 10-90% by weight inorganic beads, suitably about 20-90% by weight, or about 25-85% by weight, or about 40-80% by weight, or about 60-75% by weight. The inorganic beads provide structural integrity, abrasion resistance and corrosion resistance to the epoxy-based coating system. Suitable inorganic beads include without limitation ceramic beads formed of materials such as zirconia, alumina, bauxite as well as metal beads formed of stainless steel or other corrosion resistant materials. The inorganic beads should have diameters of about 0.5 mm to about 3.5 mm. Examples of inorganic beads include without limitation Ceramic Beads, No. 10 Grit, sold by Mineracio Curimbaba Co., Master Beads #1708 (12-20 Grit), sold by Mineracio Curimbaba Co. and AD90, 8X12 Beads sold by Coors Tek Co., all of which are formed of bauxite or other ceramic.

The resin component may include about 1-50% by weight of an epoxy functional rubber, suitably about 1-25% by weight, or about 1-10% by weight, or about 1-5% by weight. The epoxy functional rubber also contributes to abrasion resistance of the coating composition. Suitable epoxy functional rubbers include epoxy functional butadiene acrylonitriles, such as those sold by Momentive Co. under the trade name EPON 58034, and by Emerald Performance Materials under the trade name HYPDX RM 20.

The resin component can also include about 1-10% by weight, suitably about 1-5% by weight of a thickening agent, and up to about 5% by weight of a coloring agent such as titanium dioxode or carbon black. Suitable thickening agents include without limitation treated amorphous silica available from Cabot Corp. under the trade name CAB-O-SIL TS-720, or from Wacker Chemie AG under the trade name HDK H-17. One suitable white pigment is TI-PURE R-900 titanium dioxide available from E. I. DuPont DeNemours & Co.

The hardener component includes about 2-50% by weight of a butadiene acrylonitrile rubber, suitably about 5-40% by weight, or about 7-30% by weight, or about 9-20% by weight. One particularly suitable butadiene acrylonitrile rubber is amine-terminated butadiene acrylonitrile rubber. This is believed to be an important ingredient of the epoxy-based coating system for the purpose of facilitating superior abrasion resistance. Amine-terminated butadiene rubber is available from Momentive Co. under the trade name ATBN 1300X-16.

The hardener component also includes about 2-50% combined weight of one or more curing agents, suitably about 5-40% by weight, or about 10-25% by weight. Any curing agent, or combination of curing agents, can be used which are suitable for the curing of epoxy resins. Suitable curing agents include a wide variety of phenolic, aliphatic, amine and specialty curing agents. One exemplary curing agent is a blend of aminoethyl piperazine and nonylphenol, sold by Air Products and Chemicals, Inc. under the trade name ANCAMINE 1768, or by Reichhold, Inc. under the trade name EPOTUF 37-610. Another exemplary curing agent is a blend of diethylenetriamine and bisphenol-A, sold by Air Products and Chemicals, Inc. under the trade name ANCAMINE 1638. Another curing agent is a pre-catalyzed mercaptan-terminated liquid epoxy hardener, sold by Cognis under the trade name CAPCURE 40 SEC AV. Another curing agent, sold under the trade name ANCAMINE 1637, is a Mannich base modified aliphatic amine. Another curing agent is a 5-minute blend of amine-catalyzed epoxy curing mercaptan, available from Cognis under the trade name CAPCURE 3830-31 or from Gabriel Performance Products under the trade name GPM 888. The amount and type of curing agent should be chosen to obtain the desired cure speed of the coating composition. Specifically, the curing should occur long enough after the resin component and hardener component are mixed together to permit application of the coating composition to the metal surface being coated.

The hardener component also includes about 10-90% by weight inorganic beads, suitably about 20-90% by weight, or about 25-85% by weight, or about 40-80% by weight, or about 60-75% by weight. Suitable inorganic beads include without limitation ceramic beads formed of materials such as zirconia, alumina, bauxite, as well as metal beads formed of stainless steel or other corrosion resistant materials. The inorganic beads should have diameters of about 0.5 mm to about 3.5 mm. Examples of inorganic beads include without limitation Ceramic Beads, No. 10 Grit, sold by Mineracio Curimbaba Co., Master Beads #1708 (12-20 Grit), sold by Mineracio Curimbaba Co., and AD90, 8X12 Beads, sold by Coors Tek Co., all of which are formed of bauxite or other ceramic.

The hardener component can also include about 1-10% by weight, suitably about 1-5% by weight of a thickening agent, and up to about 5% by weight of a coloring agent such as titanium dioxide or carbon black. Suitable thickening agents include without limitation treated amorphous silica available from Cabot Corp. under the trade name CAB-O-SIL TS-720, or from Wacker Chemie AG under the trade name HDK H-17; and TI-PURE R-900 titanium dioxide available from E. I. DuPont DeNemours & Co. It is advantageous to employ one color, such as carbon black, for the resin component and to employ a distinctively different color, such as titanium dioxide, for the hardener component. This way, when the resin component and hardener component are stored in separate containers, users of the epoxy-based coating system will not become confused as to which components are stored in the containers.

During use, the resin component and hardener component are mixed together to form a mixture. The mixture is then applied to the metal surface of an industrial part or equipment item to form a coating. The coating is then cured, typically by allowing the coating to dry at ambient temperature, or by the application of heat. Depending on the industrial part or equipment being coated, the mixture can be applied using a spatula, trowel, or another suitable technique for applying a thick mixture.

Example 1

An inventive epoxy-based coating system was prepared having the following compositions for the resin component and the hardener component.

| Resin Component | | |
| --- | --- | --- |
| Trade Name and Supplier | Description | Percent By Weight |
| EPON RESIN DPL-862/Hexion | Bisphenol-F Resin | 14.6 |
| CAB-O-SIL TS-720/Cabot | Treated Amorphous Silica | 2 |
| EPON RESIN 58034/Hexion | Epoxy Functional Butadiene Acrylonitrile (CTBN) Rubber | 1.2 |
| KANE ACE MX-125/Kaneka Texas | Bisphenol-A Epoxy Resin/Butadiene-Acrylic Copolymer Mixture | 11.8 |

-continued

Resin Component

| Trade Name and Supplier | Description | Percent By Weight |
|---|---|---|
| CERAMIC BEADS, #10 GRIT/Mineracio Curimbaba | Ceramic Beads | 70.39 |
| ES-80002-30 BLACK/American Colors | Carbon Black Epoxy Dispersion | 0.01 |

Hardener Component

| Trade Name and Supplier | Description | Percent By Weight |
|---|---|---|
| ANCAMINE 1768/Air Products | Blend of Aminoethyl Piperazine (AEP) and Nonylphenol | 11.5 |
| ANCAMINE 1638/Air Products | Blend of Diethylenetriamine (DETA) and Bisphenol-A | 5 |
| CAB-O-SIL TS-720/Cabot | Treated Amorphous Silica | 3 |
| ATBN 1300X-16/Hexion | Amine Terminated Butadiene Acrylonitrile (ATBN) Rubber | 11 |
| CERAMIC BEADS, #10 GRIT/Mineracio Curimbaba | Ceramic Beads | 69.30 |
| R-900 TITANIUM DIOXIDE/DuPont | Titanium Dioxide | 0.20 |

The resin component and hardener component were mixed together using a trowel or spatula for small quantities of a few pounds used to coat small parts. Larger quantities can be mixed using a T-shaped mixing paddle, or a propeller-type Jiffy Mixer Model ES attached to an electric drill. In either case, the putty-type mixture should be folded and mixed thoroughly and vigorously until a homogeneous mixture is obtained.

The mixing ratio was 2 parts by volume resin per 1 part by volume hardener, which equated to 100 parts by weight resin per 45 parts by weight hardener.

The test specimens for each test were prepared according to the specifications of the particular test, as explained below. The bond-line thicknesses for the lap shear, T-peel and side impact tests were 0.125-0.16 inch. For the spin test and the grit blasting test, the sample thickness is specified in the test procedure. All samples were allowed to cure at ambient temperature (70-75° F.) for a sufficient time to complete curing before testing. The coated samples were then tested for impact abrasion resistance, sliding abrasion resistance, lap shear adhesion, T-Peel adhesion, side impact resistance, and drop impact resistance using the test procedures described below.

Using the test procedures, the samples coated with the inventive epoxy-based coating system were tested, and any results for multiple samples were averaged. The results were measured against control samples identified as Control A and Control B. Control A is a competitive ceramic bead-filled epoxy system. Control B is another competitive ceramic bead-filled epoxy system.

TABLE 1

Comparison of Inventive Coating To Control Coatings

| Property | Inventive Coating | Control A | Control B |
|---|---|---|---|
| Impact Abrasion Resistance (volume loss, cc) | 0.25 | 0.67 | 0.97 |
| Sliding Abrasion Resistance (volume loss, cc) | 0.8 | 1.1 | 1.4 |
| Lap Shear Adhesion (psi) | 1094 | 396 | 388 |
| T-Peel Adhesion (pli) | 44 | 23 | 31 |
| Side Impact Resistance (inch-lbs) | >113 | 30 | 47 |
| Drop Impact Resistance (Energy to Break, foot-lbs) | 574 | 319 | 269 |

As shown above, the inventive epoxy-based coating system yielded dramatically improved results in all six test categories, compared to the two control samples.

Examples 2 and 3

Two additional inventive epoxy-based coating systems were prepared having the following compositions for the resin component and the hardener component.

Resin Component - Example 2

| Trade Name and Supplier | Description | Percent By Weight |
|---|---|---|
| EPON Resin DPL-862/Hexion | Bisphenol F Epoxy Resin | 17.11 |
| CAB-O-SIL TS-720/Cabot | Treated Amorphous Silica | 2.80 |
| DER 331/Dow Chemical | Bisphenol A Epoxy Resin | 20.00 |
| R-900/DuPont | Titanium Dioxide | 0.09 |
| Master Beads #1708/ Mineracio Curimbaba | Bauxite Beads (12-20 Grit) | 60.00 |

Hardener Component - Example 2

| Trade Name and Supplier | Description | Percent By Weight |
|---|---|---|
| BLEND 5-MIN H (CAPCURE 3830-81 from Cognis or GPM 888 from Gabriel) | Amine-Catalyzed Epoxy Curing Mercaptan | 26.85 |
| CAPCURE 40 SEC HV/Cognis | Pre-Catalyzed Mercaptan-terminated liquid epoxy hardener | 5.55 |
| ATBN 1300X-16/Hexion | Amine Terminated Butadiene Acrylonitrile Rubber | 3.70 |
| CAB-O-SIL TS-720/Cabot | Treated Amorphous Silica | 2.80 |
| ES-80002-30/American Colors | Carbon Black Epoxy Dispersion | 0.10 |
| ANCAMINE 1638/Air Products | Blend of Diethylenetriamine (DETA) and Bisphenol-A | 1.00 |
| Master Beads #1708/ Mineracio Curimbaba | Bauxite Beads (12-20 Grit) | 60.00 |

Resin Component - Example 3

| Trade Name and Supplier | Description | Percent By Weight |
|---|---|---|
| EPON Resin DPL-862/Hexion | Bisphenol F Epoxy Resin | 16.85 |
| CAB-O-SIL TS-720/Cabot | Treated Amorphous Silica | 3.15 |

-continued

Resin Component - Example 3

| Trade Name and Supplier | Description | Percent By Weight |
| --- | --- | --- |
| DER 331/Dow Chemical | Bisphenol A Epoxy Resin | 16.85 |
| Ceramic Beads, #10 Grit/ Mineracio Curimbaba | Ceramic Beads | 62.95 |
| ES-80002-30/American Colors | Carbon Black Epoxy Dispersion | 0.20 |

Hardener Component - Example 3

| Trade Name and Supplier | Description | Percent By Weight |
| --- | --- | --- |
| ATBN 1300X-16/Hexion | Amine Terminated Butadiene Acrylonitrile Rubber | 9.90 |
| ANCAMINE 1637/Air Products | Mannich Base Modified Aliphatic Amine | 13.00 |
| CAB-O-SIL TS-720/Cabot | Treated Amorphous Silica | 3.70 |
| ANCAMINE 1768/Air Products | Blend of Aminoethyl Piperazine and Nonylphenol | 9.90 |
| Ceramic Beads, #10 Grit/Mineracio Curimbaba | Ceramic Beads | 63.00 |
| R-900/DuPont | Titanium Dioxide | 0.50 |

For each of Examples 2 and 3, the resin component and the hardener component were mixed together using the same procedure and the same volume ratio as in Example 1. The test specimens were prepared according to the same specifications described for Example 1. The coated samples were tested for impact abrasion resistance, sliding abrasion resistance, lap shear adhesion, T-peel adhesion, side impact resistance, and drop impact resistance using the test procedures described below. The inventive coating of Example 2 was tested against Control C (metal filled epoxy system with mercaptan curing agent) and Control D (silicon steel alloy filled epoxy system with polyamine curing agent). The inventive coating of Example 3 was tested against Control E (epoxy system with polyamine curing agent filled with combination of abrasion resistant fillers) and Control F (epoxy system with polyamine curing agent filled with ceramic beads).

TABLE 2

Test Results - Example 2

| Test Conducted | Inventive Coating | Control C | Control D |
| --- | --- | --- | --- |
| Sliding Abrasion Resistance (Volume Loss-cc) | 1.96 | 8.7 | 4.07 |
| Impact Abrasion Resistance (Volume Loss-cc) | 0.51 | 0.26 | 1.59 |
| Side Impact Resistance (Avg. Energy to break-lb-in/in$^2$) | 28.8 | 18.7 | 27.87 |
| Drop Impact Resistance (ft-lbs) | 170 | 149 | 213 |
| Adhesion Lap Shear (Tensile Strength-psi) | 666 | 535 | 713 |
| T-Peel Adhesion (Avg. Propagation Load-lbf) | 22 | 13.8 | 20 |

TABLE 3

Test Results - Example 3

| Test Conducted | Inventive Coating | Control E | Control F |
| --- | --- | --- | --- |
| Lap Shear Adhesion (Tensile Strength-psi) | 885.9 | 48.5 | 486 |
| T-Peel Adhesion (Avg. Propogation Load-lbf) | 29.9 | 9.5 | 20.4 |
| Side Impact Resistance (Avg. Energy to break-lb-in/in$^2$) | 79.5 | 12 | 23.7 |
| Impact Abrasion Resistance (Volume Loss-cc) | 0.36 | 5.37 | 0.4 |
| Sliding Abrasion Resistance (Volume Loss-cc) | 0.83 | 2.05 | 1.09 |
| Resistance Drop Impact (ft-lbs) | 425 | 99 | 170 |

As shown above, the inventive coating of Example 2 was roughly comparable to the two control samples (C and D) in the six test categories. The inventive coating of Example 3 was generally much better than the two control samples (E and F) in the six test categories.

Test Procedures

Impact Abrasion Resistance (Grit Blasting)

The impact abrasion test procedure measures the weight loss of a coated sample resulting from grit blasting under controlled conditions. The least amount of volume loss, measured in cubic centimeters, indicates the best performing coating composition under these conditions.

Equipment needed:

1. Empire Model S-36-1 Abrasive Blast Cabinet (Empire Abrasive Equipment Corp., Langhorne, Pa. 19041)

2. 4000 gram weighing scale to 2 decimal places readout 3. 45° angle cardboard template with inch ruler markings 4. Grit Blast gun mounting jig 5. Test Specimen: 6"×6"×⅜" cured epoxy bonded to 6"×6"×⅛" steel sheet 6. Large supply of #14 grit silicon carbide grit as blast media 7. Ceramic nozzles for blast gun, Kennemetal Boride Type CL. 198-5 nozzle dia. 5/16 inch 8 Stopwatch with count down feature Procedure:

1) With the grit storage bin cleaned and empty, weight out 2500-gram+−1 gram #14 grit Silicon Carbide and load into blast cabinet.

2) Set the grit-blast airline pressure so the gauge reads 40 psi dynamic pressure while the foot treadle is compressed and gun is throwing grit.

3) Insert new 5/16 inch hold diameter ceramic nozzle into removable nose of blast gun.

4) Preliminary to weight loss testing, the resin rich surface of the test specimen is to be removed by grit blasting. Grasp the blast gun by hand and blast by moving the gun uniformly side to side and front to rear over the resin surface for a timed period of 1 minute.

5) Blow away residual grit dust from the de-resined specimen using the cabinet compressed air line then weigh and record test specimen starting weight to nearest 0.01 grams 6) To prepare for grit-blast weight loss testing, move Gun mounting jig into the Grit Blast cabinet to a position in easy reach and view of the operator. Then place the matching steel base plate to the right of the jig and butting against it to create a 12-inch by 10-inch table space to serve as resting place for the test specimen for blasting.

7) Mount the blast gun into the mounting jig and loosely tighten the locking nut in preparation for angle adjustment.

8) Place the test specimen on the jig table space in a resin face up position to begin blasting.

9) Adjust the gun angle to obtain a 45° angle to the horizontal relative to the flat specimens as it rests on the jig table.

10) Again maintaining the 45° angle and a height adjustment if needed measure the distance from the tip of the gun barrel at its centerline to the grit strike point on the specimen to measure 2.0 inches using the inch markings on the hypotenuse side of the 45° angle triangular tool. Tighten the locking nut to lock the gun position.

11) Specimen is ready to start grit-blast weight loss test.

12) Set the stopwatch to count down 2 minutes and start the timer countdown simultaneously with the start of the blast using the foot peddle.

13) Stop the blast at exactly 2 minutes.

14) Blow off the blasted sample using air gun to remove blast residue and reweigh to obtain the weight loss.

15) Record the weight loss to 0.01 gram.

16) Repeat steps 12-15 at least three times, each time on a fresh spot of the test specimen.

17) Take an average of weight losses and divide that figure by specific gravity of the cured product to calculate the "Volume Loss".

18) Remove gun nozzle at the end of each test, measure hole diameter with caliper. When hole diameter enlarges due to wear from its initial 0.31 to 0.33 inch diameter, exchange for a new nozzle.

19) Remove and discard used grit after each specimen (i.e. every de-resin and de-dust step and third blast sequence) and add 2500 grams of new #14 silicon carbide grit.

20) Repeat steps 1-19 for each test specimen.

Sliding Abrasion Resistance (Spin Test)

The sliding abrasion test measures the weight loss of a test specimen resulting from the controlled motion (spinning) of an abrasive material relative to a surface of the test specimen. The measured weight loss is converted to volume loss by dividing it by the density of the test specimen. The least amount of volume loss, measured in cubic centimeters, indicates the best performing coating composition under these conditions. The test uses a sliding abrader 60 (shown in FIG. 5), also called a spin test apparatus, manufactured by ITW Devcon. The abrader 60 includes an electric motor 62 mounted to a pneumatic actuator 64 which facilitates up and down movement of a rotatable shaft 66. A sample disc 14 is mounted to the shaft 66, and the abrader is mounted in place to a base structure using a clamp 70. A control panel 72 controls the operation of the abrader 60.

Figure 1:
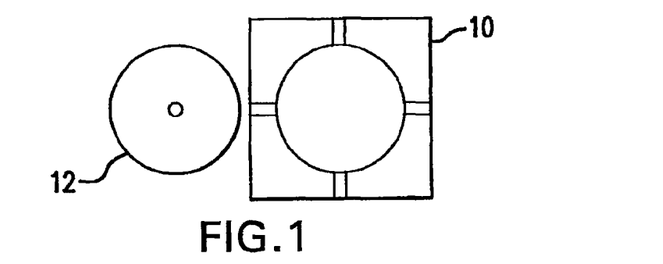
FIG. 1 is a plan view of a mold and mold cover used to cast the sliding abrasion resistance test specimen, described below.

Preparing a Test Specimen a. Utilizing a mold 10 with dimensions of 4 inches in diameter and 0.34 inches in thickness (FIG. 1), brush a thin layer of Devcon Liquid Release Agent (p/n 19600) over entire mold surface. Also brush a thin layer onto a 6" square piece of aluminum foil. Wait a minimum of 5 minutes before filling mold.

b. Select the product to be tested.

c. Properly ratio and mix a quantity of product that exceeds the size of the specimen mold.

d. Using a rigid spatula force an initial layer of product into the corners of the mold and over the bottom surface.

e. Add more product to fill the entire mold, avoid air entrapment, and press firmly. Overfill the mold slightly.

f. Place a steel panel covered with aluminum foil 12 onto product (release coated side touching material). Press the mold 10 and the steel panel in a hydraulic press until excess material oozes out of the grooves.

g. Remove the mold and the steel plate form the hydraulic press.

h. Allow product samples 14 to cure undisturbed until it has—at minimum—achieved its Functional Cure before removing from mold.

Initial Setup

1. Prepare product samples 14 (FIG. 2) to be abraded by curing them in round molds, 4 inches in diameter and 0.34 inches in thickness. FIG. 1 shows a sample mold 10 and the aluminum master disc 12.

Figure 2:
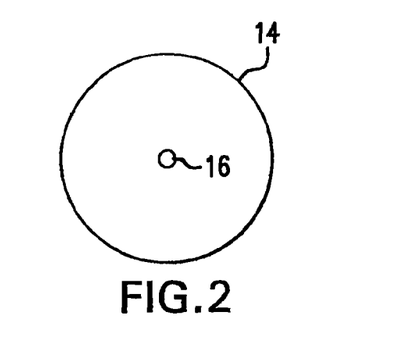
FIG. 2 is a plan view of a mold cast part used to perform the sliding abrasion resistance test.

2. After full cure, mark the center of the cured sample 14 using the aluminum master disc 12 and drill hole 16 using a ¼ inch carbide tipped drill bit. After the initial hole 16 has been made, adjust the size of the hole using a standard 5/16 inch drill bit.

3. Mark a circular ring along the drilled hole to identify the bottom side of the molded sample 14.

4. Break off any appendages on the sample 14 created during the molding process. Care should be taken to make sure that the circular shape of the sample 14 is maintained.

Break-in

5. Break-in's are to be conducted on the $6^{th}$ date of room temperature cure.

6. Measure and record the weight of the sample 14 in grams accurate to 2 decimal points.

Figure 5:
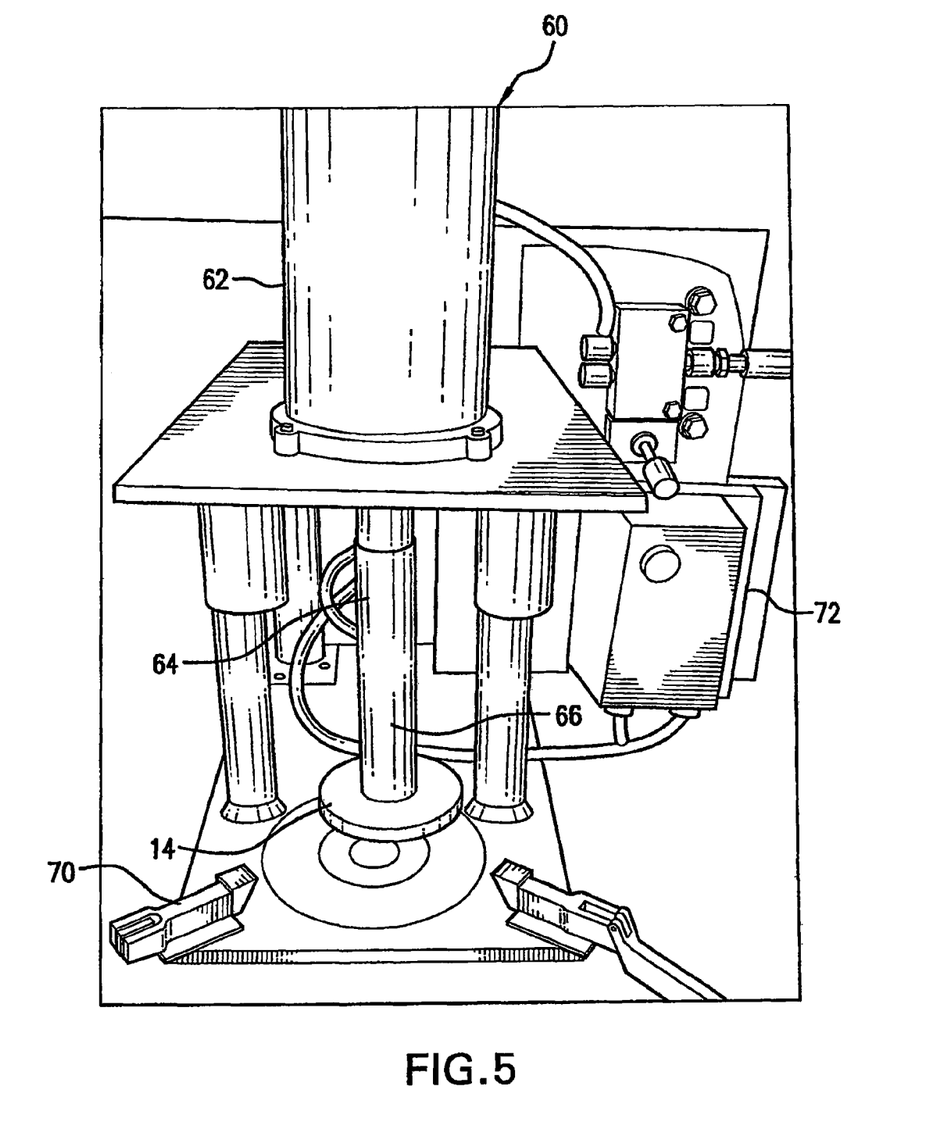
FIG. 5 is a perspective view of an abrader used to perform the sliding abrasion resistance test.

7. Mount the sample 14 on the shaft of the sliding abrader 60, using a suitable 5/16 inch bolt, washers, and wrench. Ensure that the sample is aligned perpendicular to the rotating shaft and parallel to the bottom of the metal can 20. Make sure that the top portion of the sample faces up during the first round of break-in.

Figure 3:
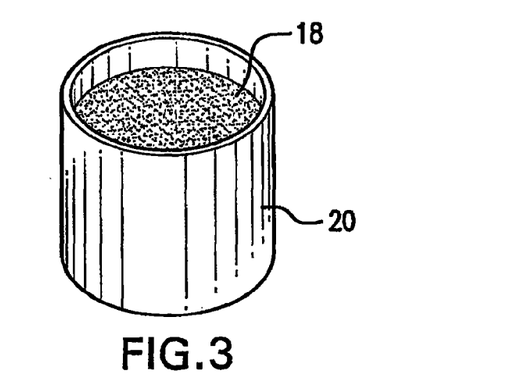
FIG. 3 is a perspective view of a metal can (grit container) used to perform them sliding abrasion resistance test.

8. Weigh 1000 grams of Silicon Carbide Grit 18 into a metal 1 gallon can 20 (FIG. 3)

Figure 4:
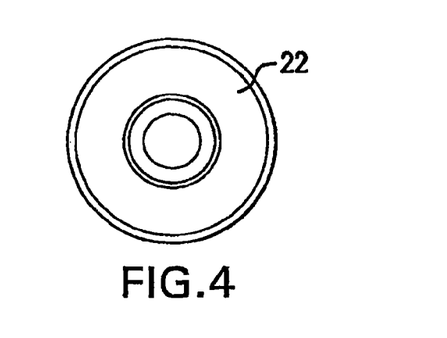
FIG. 4 is a plan view of a spacer used in performing the sliding abrasion resistance test.

9. Place the metal can 20 under the sample 14 mounted to the shaft of the abrader 60, and lower the sample 14 into the can 20. Using suitable spacers 22 (FIG. 4) adjust the height of the metal can 20 to ensure that the grit 18 is just barely touching the bottom of sample 14. Make sure that the sample 14 is centered in the metal can 20.

10. Weigh 2000 additional grams of Silicon Carbide Grit and pour into the metal can 20 above the sample 14.

11. Tare a vessel and fill with 1000 grams of water. Pour water into the metal can 20 using a funnel.

12. Measure the temperature of the grit-water mixture using a digital thermometer at the outer edge of the sample 14. To ensure an accurate reading take the average temperature from 3 random points. Tighten the grips to prevent the can 20 from spinning and misalignment.

13. Start the abrader 60 by turning ON the switch, and adjust the speed to 1000+/−10 rpm (dial setting between 5 and 6). Measure the speed of the abrader using a tachometer.

14. Run the abrader 60 for 60 minutes.

15. Check the speed of the abrader 60 every 5 minutes until stabilized. Once stabilized check speed every 10-15 minutes.

16. After 60 minutes, stop the abrader 60 by turning the switch OFF.

17. Measure the temperature of the grit-water mixture using a thermometer at the outer edge of the sample. Note down the average of 3 such readings.

18. Lift the sample 14 from the grit-water mixture using the pneumatic control valve.

19. Remove the can 20 and separate the sample 14 from the shaft of the abrader 60.

20. Wipe the sample 14 clean and dry using a suitable wipe. Blow pressurized air to blow away any remaining dust or debris.

21. Measure and record the weight of the sample 14 accurate to 2 decimal points.

22. Repeat steps 6 to 20 using fresh grit and ensuring that the opposite (bottom) side of the sample 14 faces up during the second round of break-in.

Testing Procedure:

23. Final tests are to be conducted on the 7$^{th}$ day of room temperature cure.

24. During the first testing ensure that the top portion of the sample 14 faces up.

25. Repeat steps 6 to 13.

26. Run the test for 45 minutes.

27. After 45 minutes, stop the abrader by turning the switch OFF.

28. Repeat steps 17 to 21.

29. Repeat step 22 with the bottom portion of the sample 14 facing up.

30. Conduct a minimum of 3 such experiments, until consistent results are obtained. The abrasion is caused by the spinning motion of the sample 14 relative to the abrasive Silicon Carbide Grit 18.

Lap Shear Adhesion

Lap shear adhesion was measured using a standard test, ASTM D1002. The ASTM D 1002 test procedure is incorporated by reference.

T-Peel Adhesion

T-Peel adhesion was measured using a standard test, ASTM D1876, except that the crosshead speed was reduced to two inches/minute instead of using 10 inches/minute as specified in the test procedure. The ASTM D1876 test procedure is incorporated by reference, subject to the foregoing modification.

Side Impact Resistance

Side impact resistance was measured by first preparing the samples according to a standard test, ASTM D 1002. The ASTM D 1002 test procedure is incorporated by reference. Then, to measure the side impact resistance, the procedure set forth in General Motors Test GM9751P was followed. This test measures the comparative impact value of adhesive bonds in shear when tested on standard specimens under specific conditions of preparation, conditioning and testing.

Figure 6:
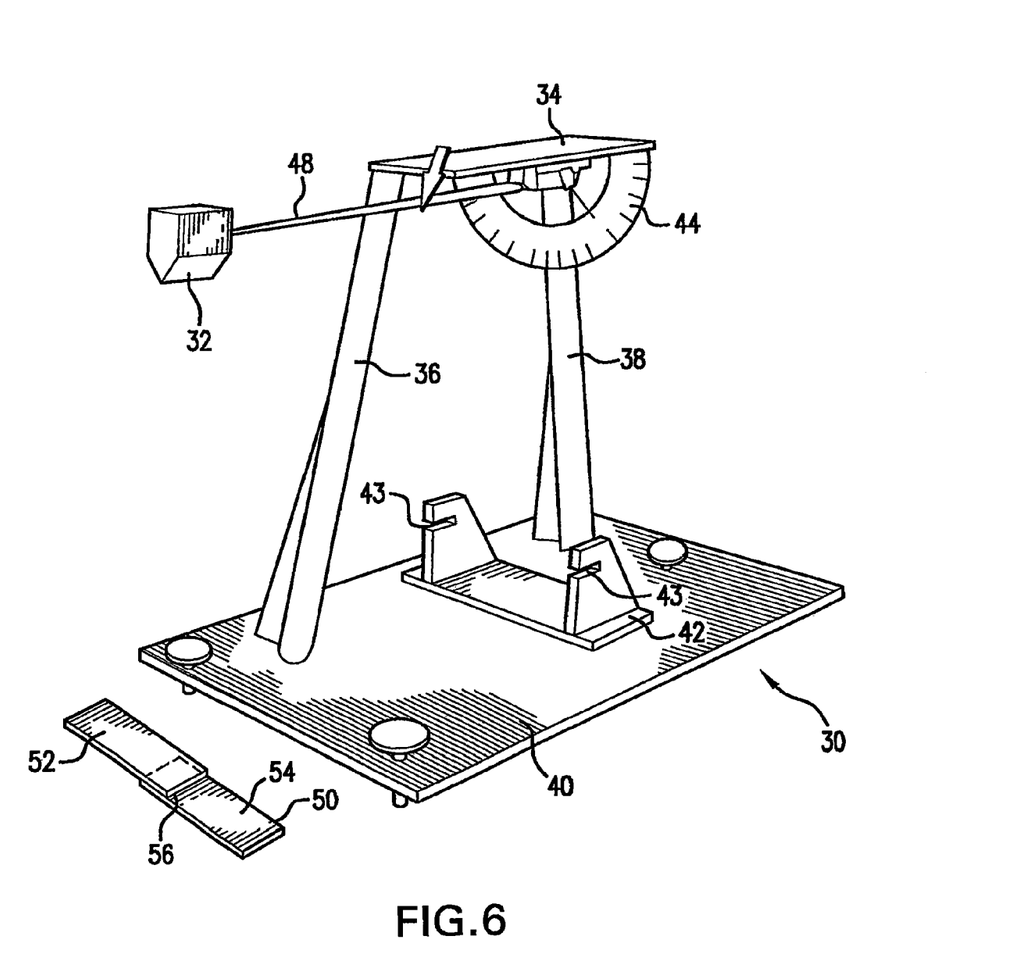
FIG. 6 is a perspective view of a pendulum testing apparatus used to perform the side impact resistance test, described below.

A pendulum testing apparatus 30, shown in FIG. 6, may be of any suitable construction that will provide adequate support and minimum friction for the moving pendulum head 32. In the illustrated apparatus, the pendulum head 32 is pivotally mounted to an upper platform 34 which is supported by stands 36 and 38 mounted to a base 40. The base 40 includes a suitable sample mounting device 42 which is constructed to securely mount samples being tested in a position that enables the pendulum head 32 to strike at right angles to the adhesive bond. The testing apparatus is also equipped with a joule indicator 44, better shown in FIG. 7.

The pendulum head 32 is positioned at a predetermined height at the start of the test using a safety catch 46. When the safety catch is released, the pendulum head 32 swings toward the adhesive-bonded sample 50 positioned in the slots 43 of mounting device 42. The process is repeated until the mounted sample 50 experiences failure at the adhesive interface 56. The total energy absorbed, in joules, required to produce failure, is recorded.

Figure 7:
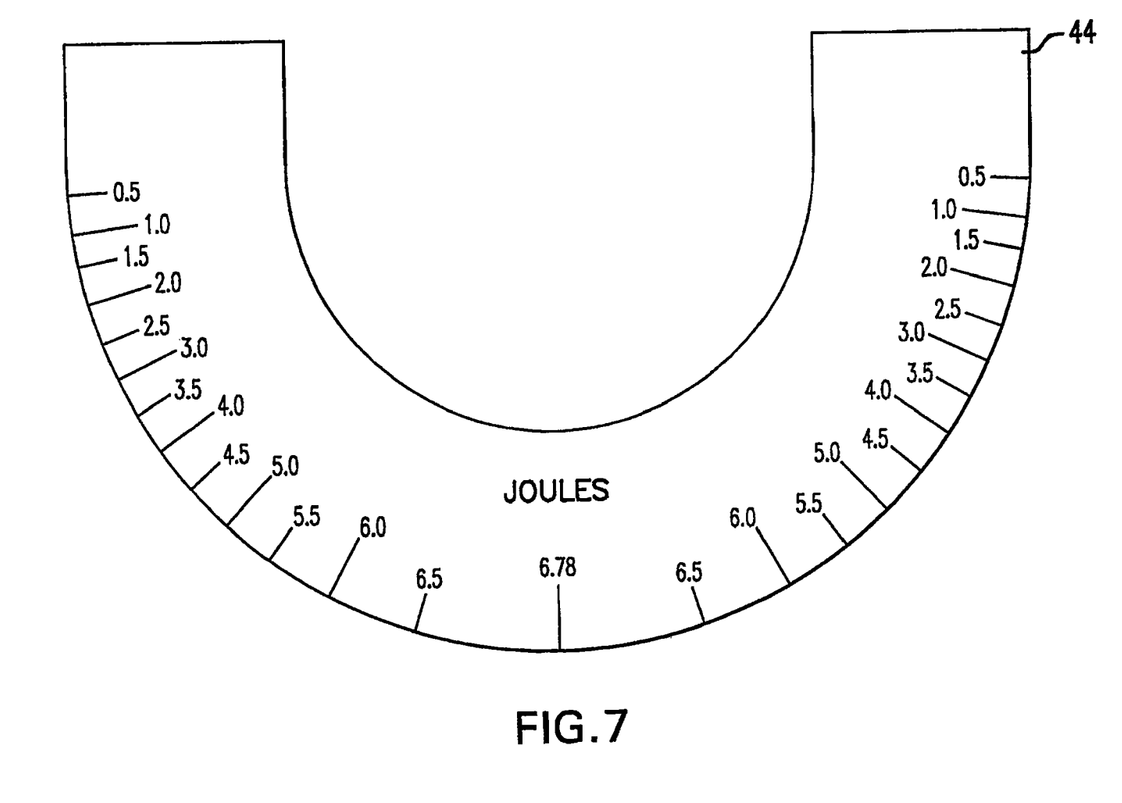
FIG. 7 is a plan view of a Joule indicator used in the pendulum testing apparatus of FIG. 6.

In the illustrated apparatus, the pendulum head 32 has a mass of 1.63 kg. The rigid stem 48 connecting the pendulum head 32 to upper platform 34 has a length of 50.8 mm (measured from the pivot mount to the center of the pendulum). The mounting device 42 is designed with slots 43 to contain a sample 50 having a width of 25.4 mm and a length of 17.78 cm. The sample 50 consists of two equally sized rectangular metal parts 52 and 54 with a 25.4 mm overlap, and the adhesive bonding composition 56 between them. The scale shown in the joule indicator 44 may, of course, very depending on the mass of the pendulum head 32 and the length of the rigid stem 48.

Drop Impact Resistance

The drop impact resistance test measures adhesive failure resulting from a heavy weight being dropped on a coated steel sample from above.

Sample Preparation

1. Use stainless steel rectangles having dimensions of 4 in.×6 in.×0.125 in.

2. Wipe the steel surface with methyl ethyl ketone. Then, grit blast the steel surfaces using Silicon Carbide Grit. Then, wipe the steel surfaces with methyl ethyl ketone again.

3. Using mold conductive to final dimensions, place 0.5" layer of product to be tested (i.e. epoxy filled with ceramic beads) onto steel. Prepare three samples of each adhesive.

4. Allow for 7 day cure at room temperature.

Test Procedure

1. Impact tester consists of an 85 lb. load with a striking surface of 0.5"×0.5" (thus 0.25 square inches)

2. Surround the impact area with flat boards to prevent travel of projectiles during impact.

3. Wear safety glasses and steel toe shoes.

4. With drop weight secured in its lowest position that still allows enough clearance to move the test sample, center/align the test sample beneath the striking head.

5. Raise the drop weight until there is a 6" span from the striking head to the top surface of the sample. Secure the drop weight.

6. Pull the test pin.

7. Record whether failure occurred or not. If so, record the height in inches at which failure occurred and the manner of failure.

8. If failure does not occur, repeat steps 4 to 7, increasing the drop height by 6" each time, until a failure occurs.

9. For second and third samples, utilize an initial test height that is two levels below the height at which the first sample ultimately failed; otherwise proceed with testing as in steps 5 through 8.

10. Average the failure height in feet for the three samples. Multiply this value in feet by 85 lbs to determine the average Drop Impact Energy in foot-lbs. Report the Average Drop Impact Energy and the Failure Mode.

The embodiments of the invention described herein are presently preferred. Various improvements and modifications can be made without departing from the spirit and scope of the invention. The scope of the invention is indicated by the appended claims, and all changes that fall within the meaning and range of equivalents are intended to be embraced therein.

We claim:

1. An epoxy-based coating system for providing abrasion resistance to metal surfaces, comprising about 40-85 parts by volume of a resin component and about 15-60 parts by volume of a hardener component stored in separate containers or compartments;
  the resin component comprising:
    a) about 10-90% combined weight of one or more bisphenol epoxy resins, and
    b) about 10-90% by weight inorganic beads having a particle diameter of about 0.5 mm to about 3.5 mm;
  the hardener component comprising:
    c) about 2-50% by weight of a butadiene acrylonitrile rubber,
    d) about 2-50% combined weight of one or more curing agents, and
    e) about 10-90% by weight inorganic beads having a particle diameter of about 0.5 mm to about 3.5 mm.

2. The epoxy-based coating system of claim 1, wherein the one or more bisphenol epoxy resins comprises bisphenol-A epoxy resin.

3. The epoxy-based coating system of claim 2, wherein the one or more bisphenol epoxy resins further comprises bisphenol-F epoxy resin.

4. The epoxy-based coating system of claim 2, wherein the resin component further comprises a butadiene-acrylic copolymer.

5. The epoxy-based coating system of claim 1, wherein the resin component further comprises about 1-50% by weight of an epoxy functional rubber.

6. The epoxy-based coating system of claim 5, wherein the epoxy functional rubber comprises epoxy functional butadiene acrylonitrile.

7. The epoxy-based coating system of claim 1, wherein the inorganic beads in the resin component comprise bauxite or ceramic beads.

8. The epoxy-based coating system of claim 1, wherein the resin component further comprises about 1-10% by weight silica.

9. The epoxy-based coating system of claim 1, wherein the butadiene acrylonitrile rubber in the hardener component comprises amine terminated butadiene acrylonitrile rubber.

10. The epoxy-based coating system of claim 1, wherein the curing agent comprises a blend of aminoethyl piperazine and nonylphenol.

11. The epoxy-based coating system of claim 1, wherein the curing agent comprises a blend of diethyltriamine and bisphenol-A.

12. The epoxy-based coating system of claim 1, wherein the inorganic beads in the hardener comprise bauxite or ceramic beads.

13. An epoxy-based coating system for providing abrasion resistance to metal surfaces, comprising about 40-85 parts by volume of a resin component and about 15-60 parts by volume of a hardener component stored in separate containers or compartments;
  the resin component comprising:
    a) about 10-80% combined weight of one or more bisphenol epoxy resins; and
    b) about 20-90% by weight of inorganic beads having a particle diameter of about 0.5 mm to about 3.5 mm;
  the hardener component comprising:
    c) about 5-40% by weight an amine terminated butadiene acrylonitrile rubber;
    d) about 5-40% combined weight of one or more curing agents; and
    e) about 25-85% by weight inorganic beads having a particle diameter of about 0.5 mm to about 3.5 mm.

14. The epoxy-based coating system of claim 13, wherein the bisphenol epoxy resins comprise a combination of bisphenol-A and bisphenol-F epoxy resins.

15. The epoxy-based coating system of claim 13, comprising about 45-80 parts by volume of the resin component and about 20-55 parts by volume of the hardener component.

* * * * *